United States Patent [19]
Yoneda et al.

[11] Patent Number: 5,355,434
[45] Date of Patent: Oct. 11, 1994

[54] METHOD AND APPARATUS FOR PERFORMING LEARNING IN A NEURAL NETWORK

[75] Inventors: Takao Yoneda, Nagoya; Tomonari Kato, Kariya; Kazuya Hattori, Nagoya; Masashi Yamanaka, Obu; Shiho Hattori, Nagoya, all of Japan

[73] Assignee: Toyoda Koki Kabushiki Kaisha, Kariya, Japan

[21] Appl. No.: 931,324

[22] Filed: Aug. 18, 1992

[30] Foreign Application Priority Data

Aug. 19, 1991 [JP] Japan .................................. 3-232401
Aug. 29, 1991 [JP] Japan .................................. 3-244774

[51] Int. Cl.$^5$ ............................................ G06F 15/18
[52] U.S. Cl. ...................................... 395/23; 395/22; 395/24; 395/54
[58] Field of Search ...................... 395/23, 24, 54, 22, 395/21

[56] References Cited

U.S. PATENT DOCUMENTS

| | | | |
|---|---|---|---|
| 4,674,034 | 6/1987 | Iwashita et al. | 395/425 |
| 4,912,649 | 3/1990 | Wood | 395/23 |
| 4,953,099 | 8/1990 | Jourjine | 395/23 |
| 5,119,468 | 6/1992 | Owens | 364/513 |
| 5,121,467 | 6/1992 | Skeirik | 395/110 |

FOREIGN PATENT DOCUMENTS 2-95543  4/1990  Japan .

OTHER PUBLICATIONS

Accelerating the Convergence of the Back–Propagation Method–T. P. Vogl, J. K. Mangis . . . Dec. 31, 1988.
IEEE Transactions on Systems, Man, and Cybernetics, vol. 19, No. 2, Mar./Apr. 1989, pp. 299–314, S. S. Rangwala, et al., "Learning and Optimization of Machining Operations Using Computing Abilities of Neural Networks".

*Primary Examiner*—Allen R. MacDonald
*Assistant Examiner*—Richemond Dorvil
*Attorney, Agent, or Firm*—Oblon, Spivak, McClelland, Maier & Neustadt

[57] ABSTRACT

An apparatus for carrying out learning operation of a neural network which has an input layer, an intermediate layer and an output layer. Plural nodes of the input layer are related to plural nodes of the intermediate layer with plural connection weights, while the plural nodes of the intermediate layer are also related to plural nodes of the output layer with plural connection weights. Although input data composed of plural components and teaching data composed of plural components are used in learning operation, some of the components are ineffective for the purpose of learning operation. During error calculation between output data from the neural network and the teaching data, the apparatus judges whether each of the components of the teaching data is effective or ineffective, and output errors corresponding to the ineffective components are regarded as zero. The connection weights are thereafter corrected based upon the calculated errors. The apparatus further comprises means for adding new input data and teaching data into a data base, and means for calculating a degree of heterogeneousness of the new teaching data. The new input data and teaching data are added to the data base only when the degree of heterogeneousness is smaller than a predetermined value.

10 Claims, 10 Drawing Sheets

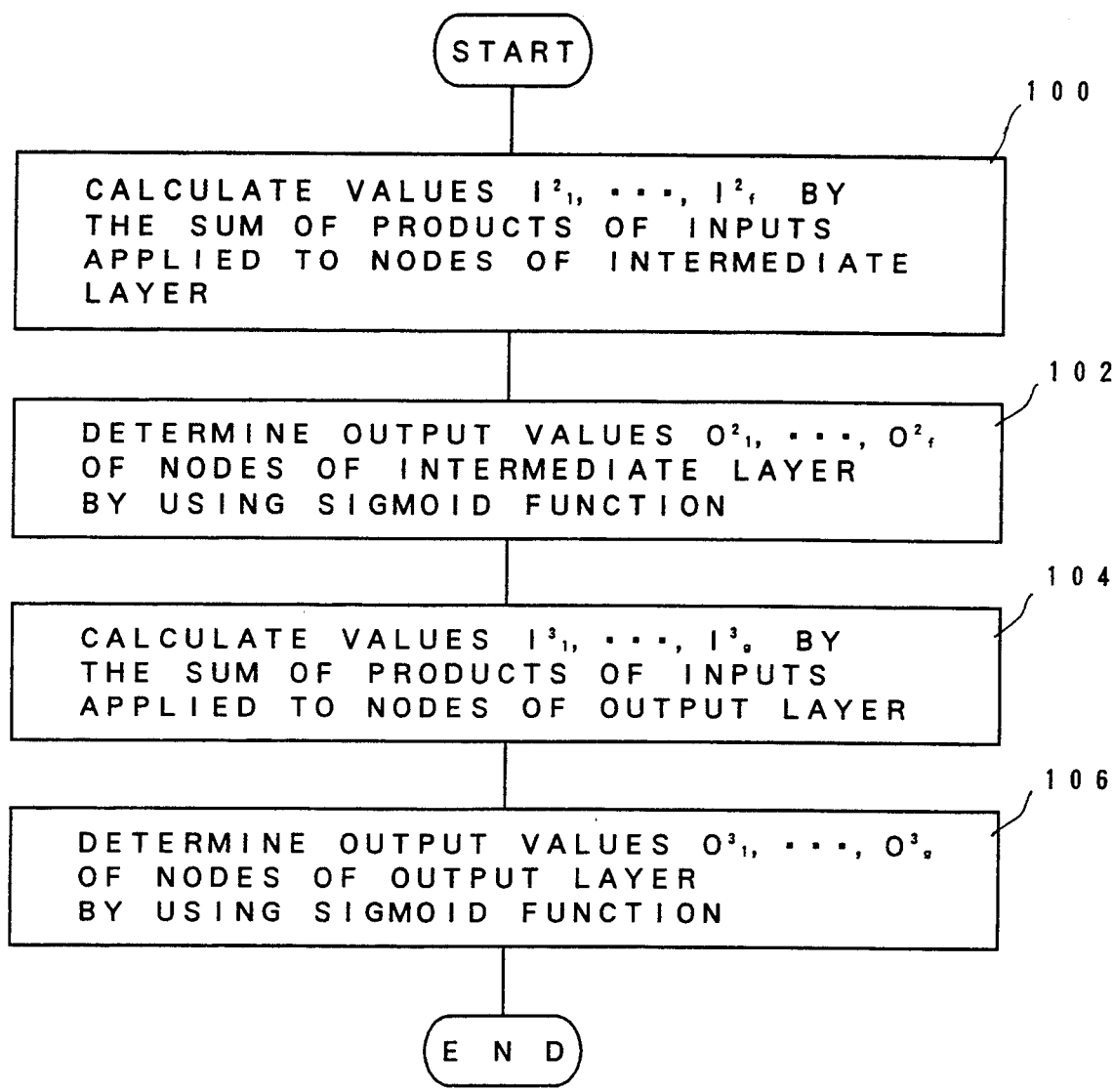

FIG. 5

| No. | INPUT DATA | TEACHING DATA |
|---|---|---|
| 1 | $D_1$ | $E_1$ |
| 2 | $D_2$ | $E_2$ |
| 3 | $D_3$ | $E_3$ |
| ⋮ | ⋮ | ⋮ |
| n | $D_n$ | $E_n$ |

FIG. 6

| COMP. No. | DATA TYPE P EFFECTIVE COMPONENTS | DATA TYPE S EFFECTIVE COMPONENTS | DATA TYPE R EFFECTIVE COMPONENTS |
|---|---|---|---|
| 1 | on | on | on |
| 2 | on | on | off |
| 3 | on | off | on |
| 4 | on | off | off |
| 5 | off | on | on |
| 6 | off | on | off |
| 7 | off | off | on |
| 8 | on | on | on |
| ... | ... | ... | ... |
| e−1 | on | off | on |
| e | on | on | on |

FIG. 7

| ITEM NO. | CONTENTS | CYLINDRICAL GRINDING | WITH SHOULDER | WITH CORNER |
|---|---|---|---|---|
| 1 | SELECTION NUMBER FOR WORKPIECE MATERIAL | ○ | ○ | ○ |
| 2 | SELECTION NUMBER FOR WHEEL MATERIAL | ○ | ○ | ○ |
| 3 | SELECTION NUMBER FOR WHEEL GRAIN SIZE | ○ | ○ | ○ |
| 4 | WIDTH OF CYLINDRICAL PORTION OF WHEEL | ○ | ○ | ○ |
| 5 | MEDIAN OF FINISHED DIAMETER | ○ | ○ | ○ |
| 6 | NUMBER OF SIZING SIGNAL | ○ | ○ | ○ |
| 7 | ALLOWANCE (CYLINDRICAL SURFACE) | ○ | ○ | ○ |
| 8 | ALLOWANCE (SHOULDER SURFACE) |  | ○ | ○ |
| 9 | SELECTION NUMBER FOR SURFACE ROUGHNESS (CYLINDRICAL SURF.) | ○ | ○ | ○ |
| 10 | SELECTION NUMBER FOR SURFACE ROUGHNESS (SHOULDER SURF.) |  | ○ | ○ |
| 11 | SELECTION NUMBER FOR DIMENSIONAL TOLERANCE | ○ | ○ | ○ |
| 12 | DIMENSION OF SHOULDER PORTION OF WHEEL |  |  | ○ |

FIG. 8

| ITEM No. | CONTENTS | CYLINDRICAL GRINDING | WITH SHOULDER | WITH CORNER |
|---|---|---|---|---|
| 1 | WORKPIECE ROTATIONAL SPEED FOR ROUGH GRINDING | ○ | ○ | ○ |
| 2 | WORKPIECE ROTATIONAL SPEED FOR FINE GRINDING | ○ | ○ | ○ |
| 3 | WORKPIECE ROTATIONAL SPEED FOR FINISH GRINDING | ○ | ○ | ○ |
| 4 | WORKPIECE ROTATIONAL SPEED FOR ROUGH GRINDING OF CORNER | | | ○ |
| 5 | WORKPIECE ROTATIONAL SPEED FOR FINISH GRINDING OF CORNER | | | ○ |
| 6 | WORKPIECE ROTATIONAL SPEED FOR ROUGH GRIND. OF SHOULDER | | ○ | ○ |
| 7 | WORKPIECE ROTATIONAL SPEED FOR FINISH GRIND. OF SHOULDER | | ○ | ○ |
| 8 | DIVISION ANGLE IN ROUGH GRIND. OF CORNER | | | ○ |
| 9 | ROUGH GRINDING START DIAMETER | ○ | ○ | ○ |
| 10 | FINE GRINDING START DIAMETER | ○ | ○ | ○ |
| ..... | ..... | ..... | ..... | ..... |
| 19 | INFEED RATE FOR FINISH GRINDING OF SHOULDER | | ○ | ○ |

METHOD AND APPARATUS FOR PERFORMING LEARNING IN A NEURAL NETWORK

BACKGROUND OF THE INVENTION

1. Field of the Invention

The present invention relates to a method and an apparatus for learning operation of a neural network.

2. Discussion of the Prior Art

A neural network has been known as a network which memorizes a sequence of cause and effect, and which is optimized by changing connection weights thereof through learning operation. For example, such neural network is composed of an input layer, an intermediate layer and an output layer, each of layers having plural nodes. Each of the nodes of the input layers is related to the respective nodes of the intermediate layers with respective connection weights or connection strengths, while each of the nodes of the intermediate layers is related to the respective nodes of the output layers with respective connection weights. During learning operation, dispersed plural input data are given to the neural network so as to correct or modify the connection weights so that reasonable output data are always obtained when any input data are given.

Namely, one pair of input data and teaching data are firstly used to correct the connection weights so that the output data from the neural network approach to the teaching data, which represent optimum values corresponding to the input data. This learning operation is repeated using a different pair of input and teaching data, and the teaching operation is stopped when all the pairs of input and teaching data are used for the learning operation. After the learning operation, the neural network exhibits a desirable input-output characteristic.

The above-mentioned neural network is recently used in machine tools for calculating optimum machining data based upon input and fixed condition data so as to properly carry out required machining operations.

In a neural network system used in the machine tools, each of the input data is composed of plural components or plural data items, such as material of a workpiece to be machined surface roughness, dimensional accuracy and the like, while each of the output data is composed of plural components or plural data items representing machining conditions such as rotational speed of the workpiece, infeed speed of a tool and the like.

However, all of the components of the input data and all of the components of the output data are not necessarily used all the time. There is a case in which a particular component or data item is used in a particular pair of input and teaching data, but not used in other pairs of input and teaching data.

For example, in grinding machines, several types of grinding cycles are carried out, and each of the grinding cycles uses different data items as machining data. In a pair of input and teaching data for the cylindrical grinding, data for shoulder grinding and corner grinding are omitted. In a pair of input and teaching data for shoulder grinding, data for corner grinding are omitted. Even in such event, the number of the input nodes of the neural network, namely the number of the nodes in the input layer of the neural network is set to be equal to the number of all the input data items or components of the input data, while the number of the output nodes of the neural network, namely the number of the nodes in the output layer of the neural network is set to be equal to the number of all of the output data items or components of the output data. In such system, predetermined constant values are given to the input nodes as data for omitted input data items, while some components output from the output nodes corresponding to the omitted data items are ignored, because the ignored components take meaningless values.

Such system therefore has a problem in that the connection weights of the neural network are corrected based upon the meaningless values of the ignored components, whereby the input-output characteristic of the neural network is modified in a wrong direction. This problem becomes more serious when the number of the omitted data items increases.

Further, a problem sometimes occurs in the conventional neural network system in that outputs data from the neural network take inappropriate values.

In such case, the input-output characteristic of the neural network must be corrected, and a pair of new input data and new teaching data are further added to the data base to carry out a renewal learning and thereby to correct the input-output characteristic thereof.

However, the addition of the new input data and new teaching data may sometime cause a drastic change of the input-output characteristic, whereby a part of the input-output characteristic which is to be maintained is also drastically changed.

Therefore, an operator experimentally judges whether or not the new input data and new teaching data can be used, namely, whether or not these data match with the tendency of the past learning process of the neural network. The operator then adds the new input data and new teaching data into the data base for the renewal learning of the neural network, only when the new input data and new teaching data match with the tendency of the past learning process.

As described above, in the conventional system, new input data and new teaching data must be evaluated by the operator with his experiment and sixth sense. Therefore, the renewal learning operation has been time consuming and very difficult work. Further, the neural network may sometime be renewed undesirably, whereby the input-output characteristic of the neural network is inappropriately changed to have an undesirable characteristic.

SUMMARY OF THE INVENTION

Accordingly, it is an object of the present invention to provide an improved method and apparatus for properly carrying out the learning operation of a neural network.

Another object of the present invention is to provide improved method and apparatus for properly carrying out the learning operation of a neural network even in cases where some data items are omitted from some of input data and teaching data.

Still another object of the present invention is to provide an improved method and apparatus for carrying out the learning operation of a neural network wherein a renewal learning operation is carried out to conform with the tendency of the past learning process of the neural network.

Briefly, a neural network according to the present invention has at least an input layer comprising plural input nodes and an output layer comprising plural output nodes. During the learning operation of the neural network, plural pairs of input data and teaching data are used. Input data of each pair given to the neural network comprises plural components to be applied to the input nodes of the neural network, respectively. The teaching data of each pair also comprises plural components corresponding to the respective output nodes of the neural network, and represents optimum or desired output values to be output from the neural network when corresponding input data are input to the neural network.

According to the first aspect of the present invention, an ordinal error calculation is carried out for effective components, but special treatment is taken for ineffective components. Regarding effective components, output errors are calculated using the effective components, namely the output errors are calculated-based upon differences between the values of the effective components and corresponding output values from the neural network. On the contrary, regarding the ineffective components, the output errors are regarded as zero. Namely, output values from the output nodes corresponding to the ineffective components of the teaching data are treated as correct values, and the connection weights of the neural network are corrected under this assumption.

With this arrangement, it is possible to prevent the ineffective components from affecting the connection weights of the neural network. Accordingly, even if a learning operation is carried out using input data and output data comprising ineffective components, the characteristic obtained through the past learning operations which have been carried out using other teaching data are not affected by the values of the ineffective components. As a result, it is possible to properly carry out the learning operation of the neural network even in cases where some data items are omitted from some input data and teaching data.

According to another aspect of the present invention, differences between output data and teaching data are calculated, as a degree of heterogeneousness (hereinafter referred to as "heterogeneousness degree"), every time when new input data and new teaching data are given for the renewal learning of the neural network. The heterogeneousness degree is compared with a predetermined threshold value. When the heterogeneousness degree is smaller than the value, the new input data and new teaching data are added into the data base for learning operation. When the heterogeneousness degree is larger than the value, the new input data and new teaching data are not added into the data base.

With this arrangement, it is possible to prevent heterogeneous input and teaching data from being added to the data base. Therefore, it is possible to prevent the neural network from having an input-output characteristic outside of an agreeable range.

Further, in a preferred embodiment, the threshold value is changed in accordance with the number of the renewal learning. In this case, the fitness of the new input data and new teaching data is judged taking the progress of the learning operation into consideration.

According to the second aspect of the present invention, it is possible to efficiently carry out optimum learning operations without relying an operator's experience and sixth sense.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 3 is a flowchart showing a processing of the CPU shown in FIG. 1 which realizes the operation of the neural network;

Figure 9:
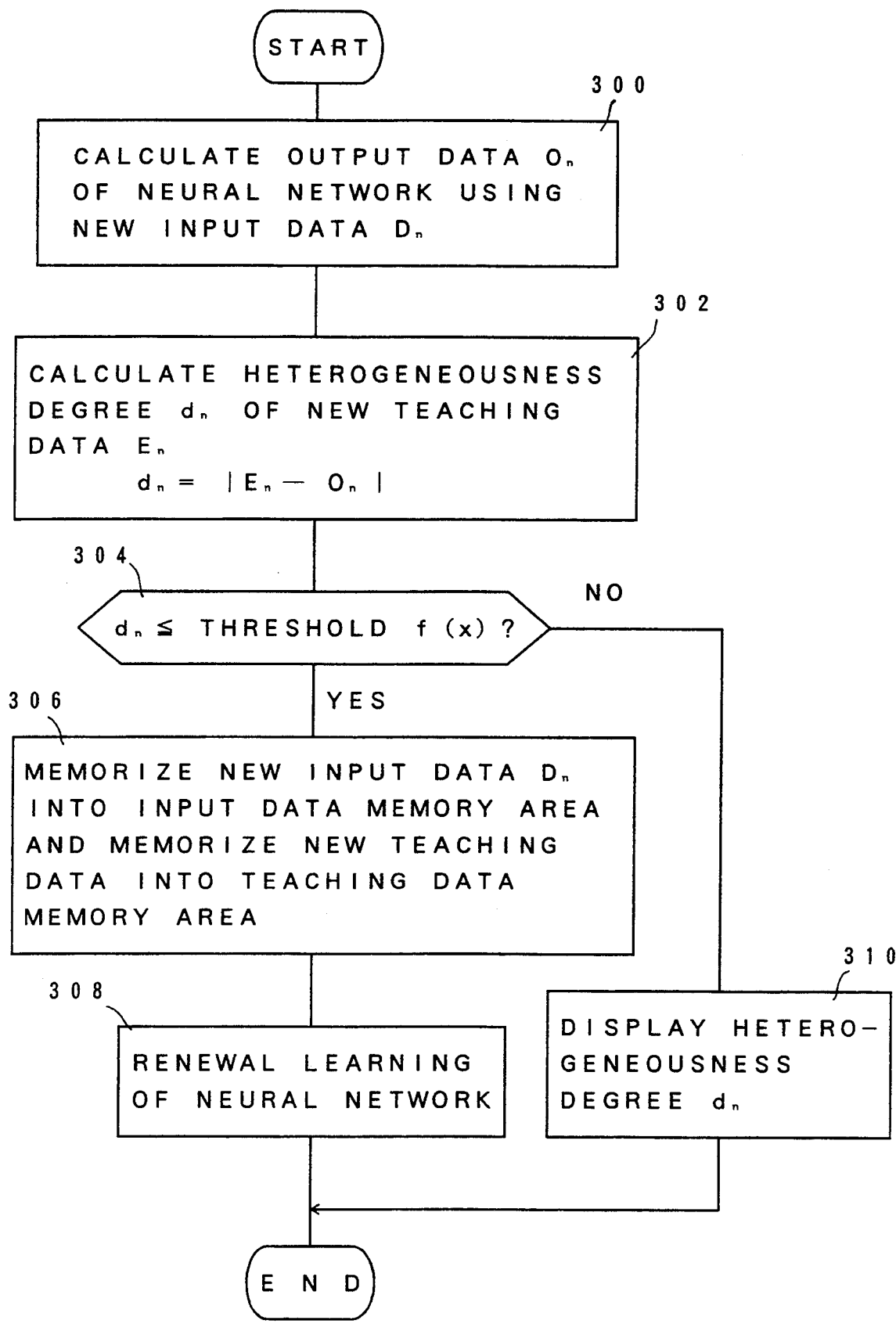
Figure 10:
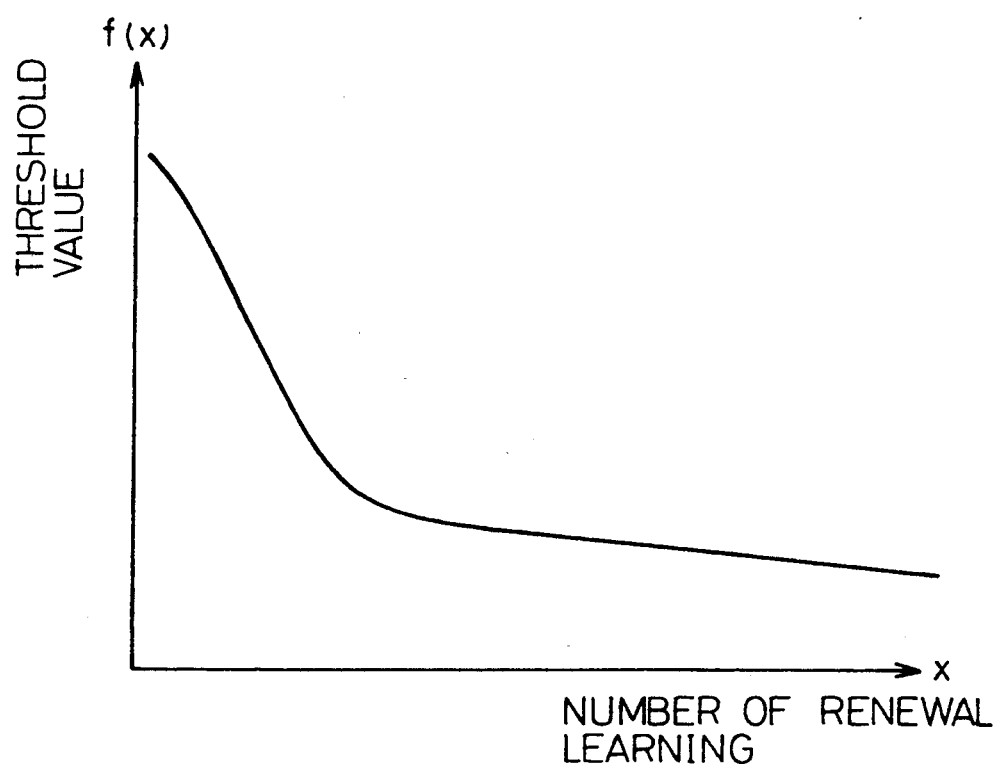

FIGS. 4 (a) and 4(b) are flowcharts showing a processing of the CPU during a learning operation;

FIG. 5 is a chart showing the contents of a data base;

FIG. 6 is a chart showing a discrimination data table for memorizing data indicating whether each component of teaching data is effective component or ineffective component;

FIG. 7 is an explanation chart showing data items of the input data;

FIG. 8 is an explanation chart showing data items of the teaching data;

FIG. 9 is a flowchart showing a processing of the CPU for adding new input data and new teaching data into the data base; and FIG. 10 is a chart showing a relationship between the number of renewal learning operations and a threshold value.

DETAILED DESCRIPTION OF THE PREFERRED EMBODIMENT

Referring now to the drawings, a preferred embodiment of the present invention will be described.

1. Structure of System

Figure 1:
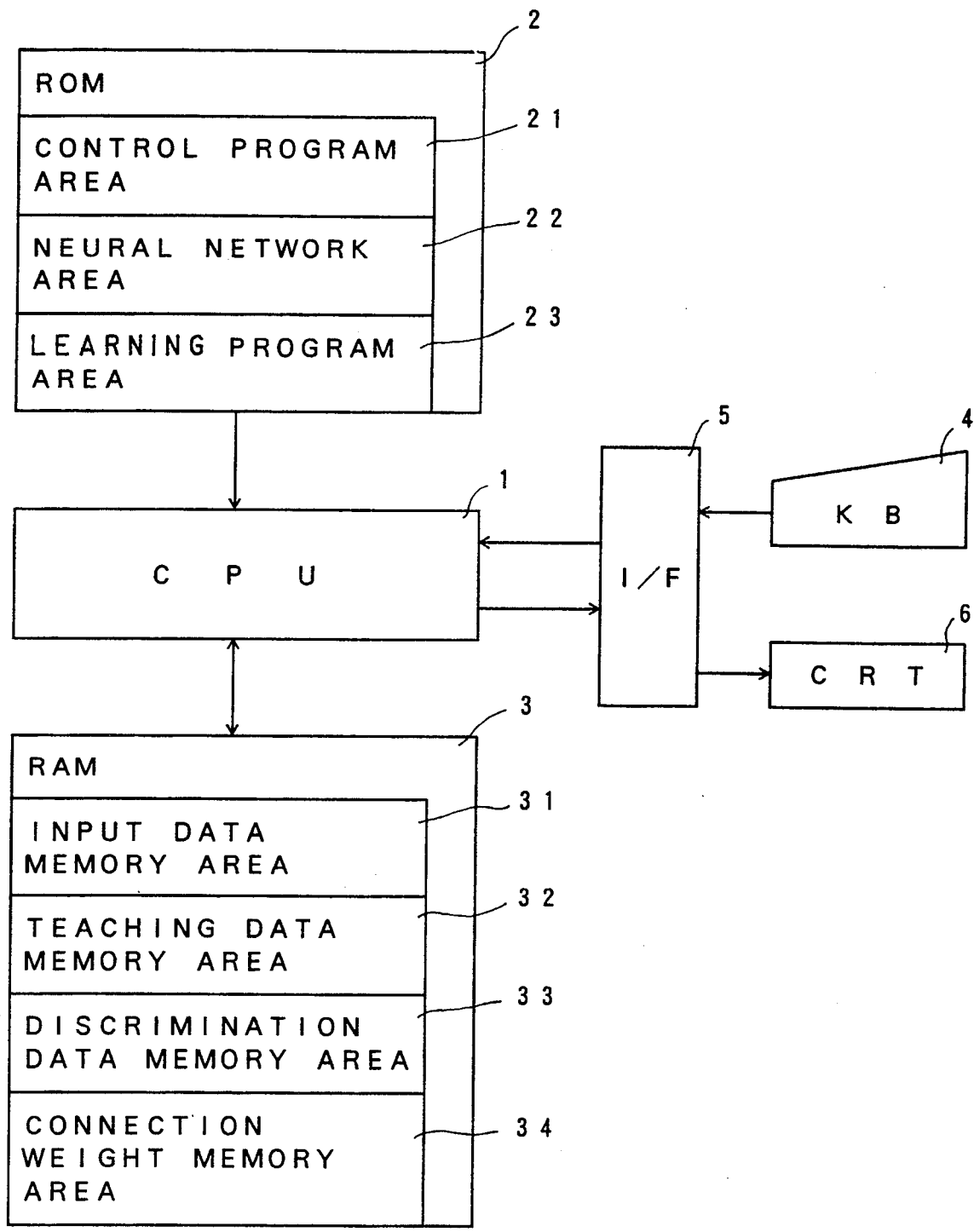
FIG. 1 is a block diagram showing a computer system having a neural network according to a present invention.

A system is designed for automatically generating optimum machining condition data, and is composed of a central processing unit (CPU) 1, a read only memory (ROM) 2, a random access memory (RAM) 3, an interface 5, a keyboard 4 and a display device 6 having a cathode ray tube (CRT), as shown in FIG. 1. The system is connected with a numerical controller (not shown) through an interface (also not shown) so that machining condition data generated in the system are transferred to the numerical controller. The numerical controller controls a not shown grinding machine in accordance with the the machining condition data.

In the ROM 2, there are formed a control program area 21 in which a control program for general control is memorized, a neural network area 22 in which a program constituting a neural network 10 is memorized, and a learning program area 23 in which a program for learning operation of the neural network is memorized. In the RAM 3, there are formed an input data memory area 31 for memorizing input data, a teaching data area 32 for memorizing teaching data, discrimination data memory area 33 for memorizing discrimination data which indicate whether each component of the teaching data is an effective component or ineffective component, and a connection weight memory area 34 for memorizing connection weights of the neural network. The input data in the input data memory area 31 and the teaching data in the teaching data memory area 32 constitute a data base for learning and renewal learning operations for a neural network 10.

2. Neural Network

Figure 2:
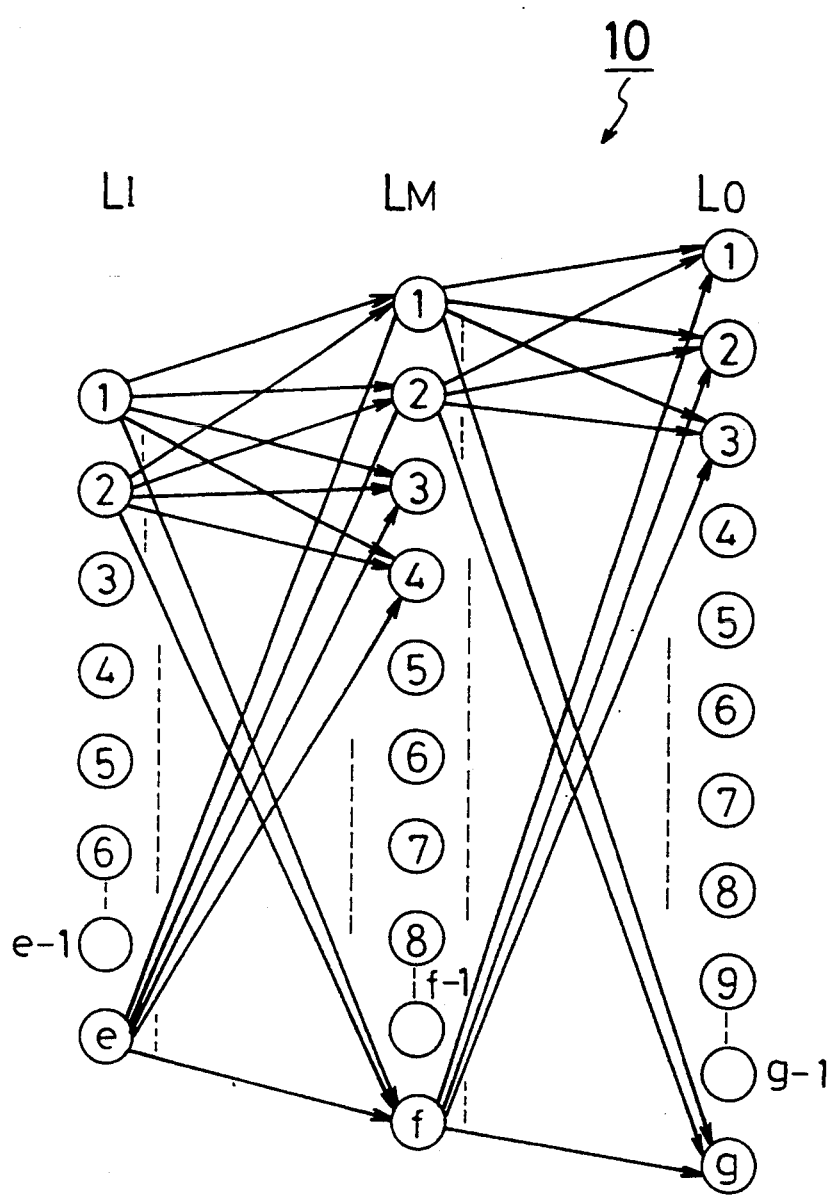
FIG. 2 is a chart showing the structural model of the neural network.

The neural network 10 in this embodiment is composed of an input layer LI, an output layer LO and an intermediate layer LM, as shown in FIG. 2.

The input layer LI has plural input nodes whose total number is e, the output layer LO has plural output nodes whose total number is g, and the intermediate layer LM has plural output nodes whose total number is f.

The output $O^i_j$ of the j-th node of the i-th layer is calculated by using the following equations, wherein i is an integer larger than 1:

$$O^i_j = f(I^i_j) \tag{1}$$

$$I^i_j = \sum_k W^{i-1}_{k,j} \cdot {}^{i-1}k + V^i_j \tag{2}$$

$$f(x) = 1/\{1 + \exp(-x)\} \tag{3}$$

where $V^i_j$ is a bias for the j-th node of the i-th layer, and $_wi-1_k, i_j$ is a connection weight between the k-th node of the (i−1)-th layer and the j-th node of the i-th layer.

Since the first layer directly outputs values which are input thereto without operation of the above expressions, the output value $O^1_j$ of the j-th node of the input layer (the first layer) LI is equal to the value input thereto.

Detailed operation of the neural network 10 having three-layer structure will now be explained with reference to the flowchart shown in FIG. 3.

The operation is carried out by executing a program memorized in the neural network area 22 of the ROM 2 with reference to connection weights memorized in the connection weight memory area 34 of the RAM 3.

In step 100, the output values $O^1_j$ of respective nodes of the input layer (the first layer) LI are applied to the nodes of the intermediate layer (the second layer) LM, and then the j-the node of the second layer executes an operation to obtain the sum of products expressed by using the following expression:

$$I^2_j = \sum_{k=1}^{e} W^1_{k,j}{}^2 \cdot O_k{}^1 + V^2_j \tag{4}$$

Then, in step 102, the output values of the nodes of the intermediate layer (the second layer) LM are calculated by using the sigmoid function of the values calculated by using the expression (4). The output of the j-th node of the second layer is calculated by using the following expression:

$$O^2_j = f(I^2_j) = 1/\{1 + \exp(-I^2_j)\} \tag{5}$$

The output values $O^2_j$ are applied to the nodes of the output layer (the third layer) LO.

Then, in step 104, the sum of products of the inputs applied to each of the nodes of the output layer (the third layer) LO is calculated by using the following expression:

$$I^3_j = \sum_{k=1}^{f} W^2_{k,j}{}^3 \cdot O_k{}^2 + V^3_j \tag{6}$$

Then, in step 106, the output values $O^3_j$ of the nodes of the output layer LO are calculated by using a sigmoid function similarly to the expression (5).

$$O^3_j = f(I^3_j) = 1/\{1 + \exp(-I^3_j)\} \tag{7}$$

3. Structures of Input Data and Teaching Data

A data base used for learning and renewal learning has a structure as shown in FIG. 5. Plural input data are indicated by reference signs $D_1$ through $D_n$ while corresponding teaching data are indicated by reference signs $E_1$ through $E_n$. These n pairs of input data and teaching data are accumulated during an initial learning period of the neural network and during the time when the neural network is actually used.

The input data are defined as follows. Each input data comprises e pieces of data or components which correspond to e pieces of the input nodes (the nodes of the input layer LI). Further, m-th input data is indicated as $D_m$, and a piece of data (data item) of the input data corresponding to j-th input node is indicated as $d_{mj}$. In other words, $D_m$ is a vector, while $d_{mj}$ is a component thereof.

Namely, $D_m$ is expressed as follows:

$$D_m = (d_{m1}, d_{m2}, \ldots, d_{me-1}, d_{me}) \tag{8}$$

Further, n sets of input data are expressed as $D_1$, $D_2$ ......, $D_{n-1}$, $D_n$, respectively. A group Comprising n sets of input data is referred to as input data group D in the following explanation.

When the expression (4) is applied to the input data $D_m$, component $d_{mk}$ is substituted for $O^1_k$ of the expression (4).

Similarly, $E_1, \ldots, E_n$ are defined as follows. Each teaching data comprises g pieces of data which correspond to g pieces of the output nodes (the nodes of the output layer LO). Further, m-th teaching data is indicated as $E_m$, and a piece of data (data item) of the teaching data corresponding j-th output node is indicated as $e_{mj}$. In the other word, $E_m$ is a vector, while $e_{mj}$ is a components thereof.

Namely, $E_m$ is expressed as follows:

$$E_m = (e_{m1}, e_{m2}, \ldots, e_{mg-1}, e_{mg}) \tag{9}$$

Further, n sets of teaching data are expressed as $E_1$, $E_2$ ......, $E_{n-1}$, $E_n$, respectively. A group comprising n sets of teaching data is referred to as teaching data group E in the following explanation.

Data (P, S, R) indicating the kind of data is given to each of the input data and teaching data so that the input data and teaching data are classified into three data types or categories, namely, type P, type S and type R. Data of type P are data for a first grinding cycle for grinding a cylindrical surface only, data of type S are data for a second grinding cycle for grinding a cylindrical surface with a shoulder, and data of type R are data for a third grinding cycle for grinding a cylindrical surface with a corner. FIG. 7 shows data items included in the input data for the above three types of grinding cycles, while FIG. 8 shows data items included in the teaching data for the above three types of grinding cycles. As is clearly under stood from FIGS. 7 and 8, different data items are used for respective grinding cycles. This means that the input data and teaching data include ineffective components, whose values have no meaning for the purpose of learning operation.

Therefore, a discrimination data table as shown in FIG. 6 is formed in the discrimination data memory area 33 of the RAM 3 for memorizing data indicating whether each of the data items is effective component or ineffective component. Namely, for each of data items (components) of three types of data, "on" or "off" is written. Data items marked by "on" are effective components while data items marked by "off" are ineffective components. The effective components are components which are actually used and the values of which have meanings. On the contrary, the ineffective components are components which are not used and the values of which do not have meanings.

4. Learning of Neural Network

Figure 4A:
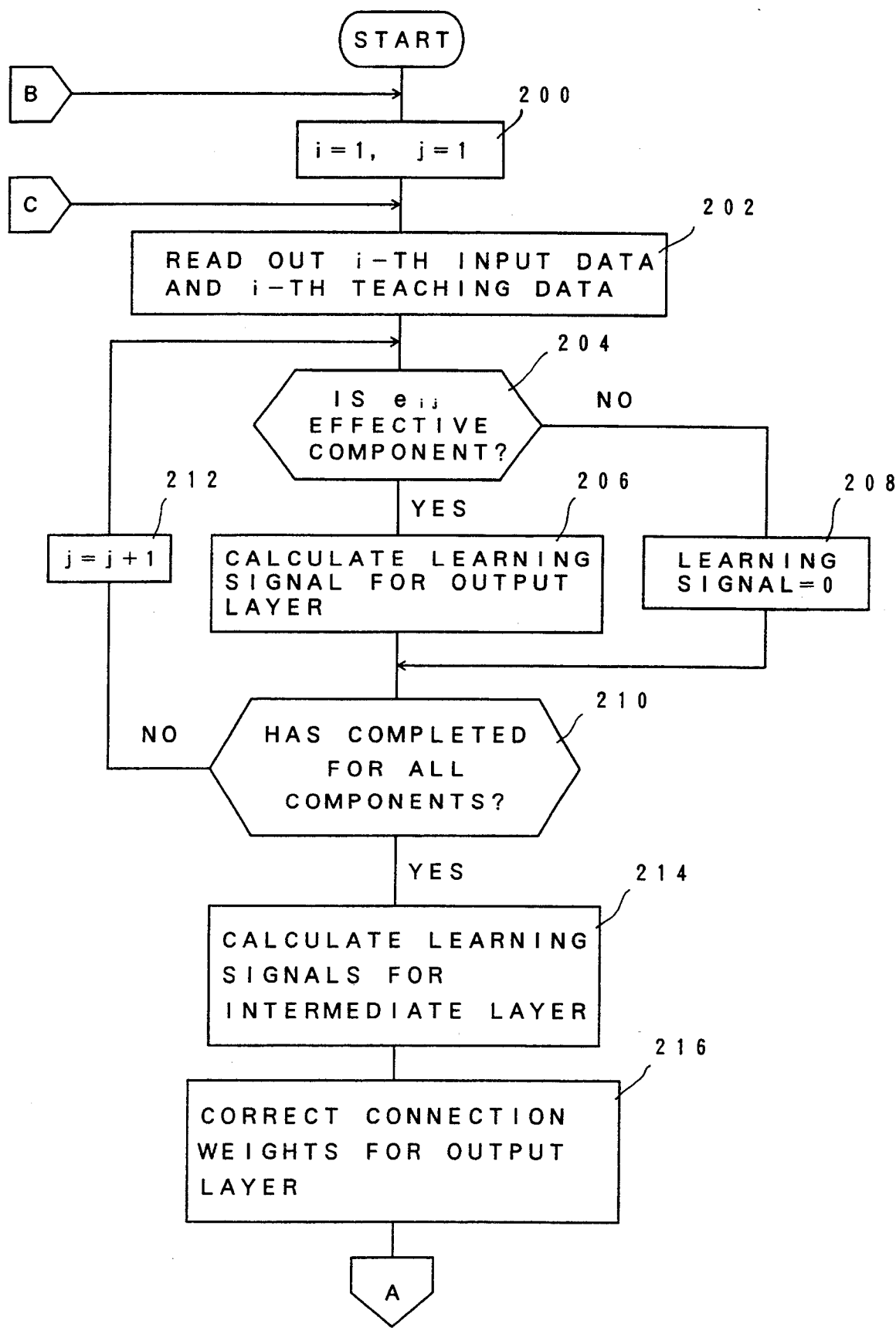
Figure 4B:
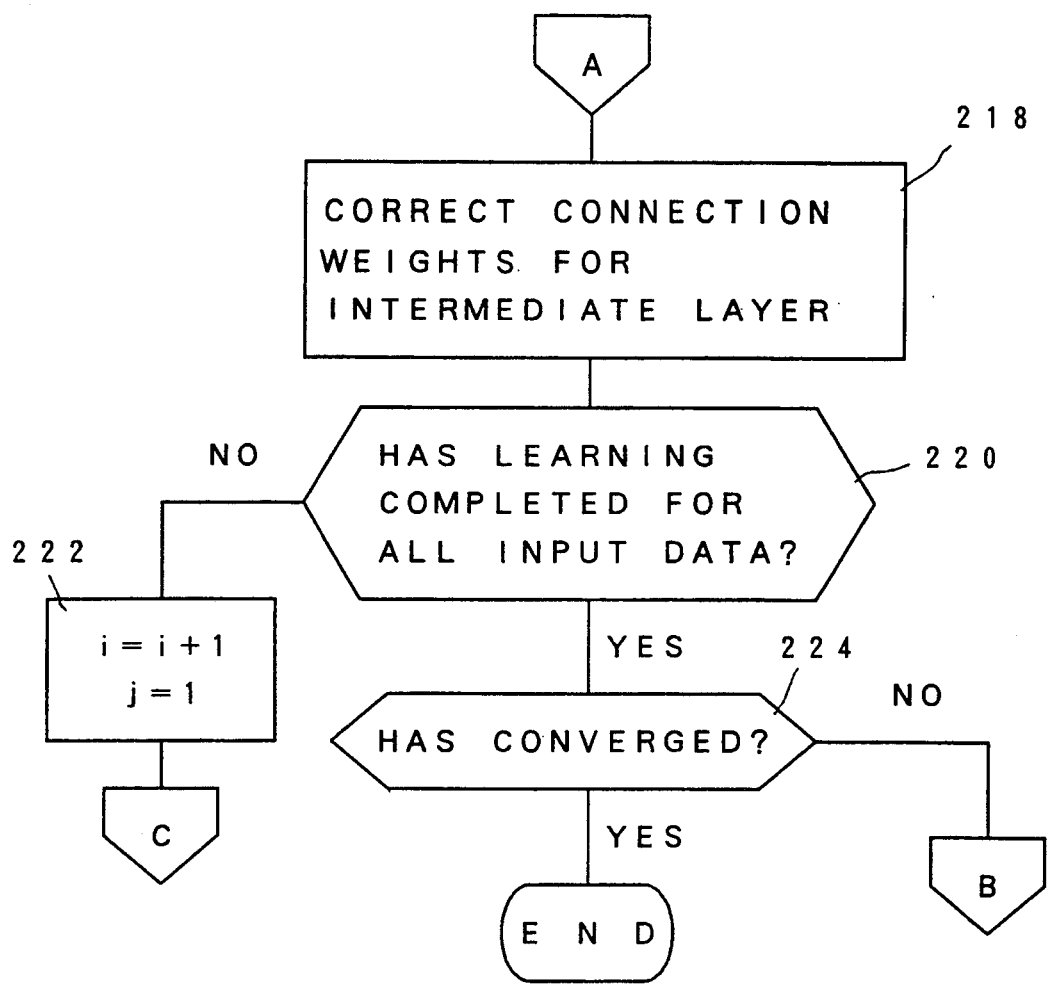

The learning operation of the neural network is carried out, during the initial learning period, by executing the program memorized in the learning program memory area 23 of the ROM 2. The program is shown by the flowcharts of FIGS. 4(a) and 4(b). The learning of the connection weights, namely, correction of the connection weights is carried out by a well-known back-propagation method.

This learning operation is repeated until respective output data corresponding to plural sets of input data become equal to corresponding teaching data. As mentioned above, these input data and teaching data are memorized in the input data memory area 31 and the teaching data memory area 32.

In step 200, a variable i representing a data number is set to an initial value 1, and a variable j representing the node number of an output node (component number of teaching data) is set to an initial value 1.

In next step 202, i-th input data $D_i$ and i-th teaching data $E_i$ are read out from the input data memory area 31 and the teaching data memory area 32, respectively.

Then, in step 204, it is judged whether j-th component $e_{ij}$ of the i-th teaching data $E_i$ is an effective component or not by reference to the discrimination data table memorized in the discrimination data memory area 33. When the component $e_{ij}$ is an effective component, the processing moves to step 206 in which a learning signal for an node of the output layer LO corresponding to the judged component is calculated by the following expression:

$$Y^3j = (e_{ij} - O^3j) \cdot f'(I^3j) \quad (10)$$

where data number i is omitted from $Y^3j$, $O^3j$, $I^3j$, and $f'(x)$ is the derivative of a sigmoid function.

Further, the values $I^3j$ can be obtained as follows. Firstly, the respective components of input data $D_i$ are substituted for $O^1_k$ of the expression (4) to obtain the values of $I^2_k$ for all of the nodes of the intermediate layer LM, and then the values of $I^2_k$ are substituted for the expression (5) so as to obtain output values $O^2k$. After that, the values $O^2k$ are substituted for the expression (6) to obtain the values $I^3j$. The values $O^3j$ can be obtained by substituting the values $I^3j$ for the expression (7).

On the contrary, when it is judged in step 204 that the component $e_{ij}$ is an ineffective component, the processing moves to step 208 in which the learning signal $Y^3j$ is set to zero.

In next step 210, it is judged whether or not the learning operation has been carried out for all of the output nodes or all of the components. When it is judged that the learning operation has not been carried out for all of the output nodes yet, the processing moves back to step 204 through step 212 in which the variable j is incremented by one. With this operation, the above learning operation is repeated for a different output node.

When it is judged at step 210 that the learning operation has already been carried out for all of the output nodes, the processing moves to step 214 in which a learning signal for r-th node of the intermediate layer LM is calculated by the following expression:

$$Y_r^2 = f'(I_r^2) \cdot \sum_{k=1}^{g} Y_r^3 \cdot W_{r,k}^2{}^3 \quad (11)$$

The above calculation for learning signals are carried out for all of the nodes of the intermediate layer LM.

In step 216, the connection weight of each node of the output layer LO is corrected or modified with a correction value. The correction value is obtained by the following expression:

$$dW^2_{i,}{}^3 j(t) = P \cdot Y^3 j \cdot f(I^2{}_i) + Q \cdot dW^2_{i,}{}^3 j(t-1) \quad (12)$$

where $dW^2_{i,}{}^3 j(t)$ represents a variation of the combination weight between the j-th node of the output layer LO and the i-th node of the intermediate layer LM in the t-th calculation, $dW^2_{i,}{}^3 j(t-1)$ is a correction value for the connection weight in the (t−1)-th calculation, and P and Q are proportional constants. Therefore, a corrected connection weight is calculated by the following expression:

$$W^2_{i,}{}^3 j + dW^2_{i,}{}^3 j \rightarrow W^2_{i,}{}^3 j \quad (13)$$

After the processing has moved step 218, the connection weight of each node of the intermediate layer LM is corrected. The correction amount of each connection weight is obtained by the following expression:

$$dW^1_{i,}{}^2 j(t) = P \cdot Y^2 j \cdot f(I^1{}_i) + Q \cdot dW^1_{i,}{}^2 j(t-1) \quad (14)$$

Therefore, a corrected connection weight is calculated by the following expression:

$$W^1_{i,}{}^2 j + dw^1_{i,}{}^2 j \rightarrow W^1_{i,}{}^2 j \quad (15)$$

In step 220, it is judged whether or not a series of learning operation using the n sets of input data and teaching data has completed. When the series of the learning operations has not completed yet, the processing moves to step 222 in which the variable i is incremented by one so that next input data and next teaching data are read from the input data memory area 31 and the teaching data memory area 32, respectively, and the variable j is set to the initial value 1. After that, the processing moves back to step 202 to repeat the learning operation with the next input data and teaching data.

When it is judged at step 220 that the learning operation using n sets of input data and teaching data has been completed, the processing moves to step 224, in which it is judged whether or not the connection weights have converged. This judgment is carried out by judging whether or not a squared value of the differences between the output data and the teaching data becomes smaller than a predetermined value.

When it is judged that the connection weights have not converged yet, the processing moves back to step 200 for carrying out a second learning operation using the n sets of input data and teaching data.

The processing is repeated until it is judged at step 224 that the squared value of the differences between the output data and the teaching data becomes smaller than a predetermined value, i.e. until the connection weights have converged.

As described above, when the learning signal is calculated using any one of ineffective components of the teaching data, the learning signal $Y^3j$ is set to zero. Namely, the output error at that time is regarded as zero. Accordingly, the connection weight between j-th node of the output layer LO and i-th node of the intermediate layer LM is corrected using the previous compensation value of the connection weight, as is clearly understood from the expression (12).

Further, since the learning signal $Y^3j$ is set to zero, the ineffective component of the teaching data does not affect the learning signals $Y^2j$ for the respective nodes of the intermediate layer LM, as is clearly understood from the expression (11). Accordingly, an ineffective component of the teaching data does not affect the connection weight between j-th node of the intermediate layer LM and i-th node of the input layer IL, as is clearly understood from the expression (14).

After all, the connection weights of the neural network are not affected by the ineffective components of the teaching data. Accordingly, it is possible to prevent the ineffective components from affecting the result of learning which has been carried out using other teaching data in which the components are not ineffective but effective.

5. Renewal of Data

After the above-described learning operation, the neural network 10 has a predetermined input-output characteristic.

When the neural network is actually used after such initial learning, new input data and new teaching data are input through the keyboard 4, and are added to the data base, and renewal learning is then carried out. Such addition of the input and teaching data and the renewal learning are carried out when undesirable output data are output from the neural network 10.

Before the renewal learning, it is judged whether or not the addition of the new input data and new teaching data give a bad influence to the neural network 10. Thus, the new input data and new teaching data are added to the data base only if the addition of the new input data and new teaching data does not give any bad influence to the neural network 10.

The detail operation will now be explained with reference to FIG. 9.

In step 300, new input data $D_n$ are input to the neural network 10 so that output data $O_n$ are calculated therein. The output data $O_n$ are calculated in accordance with the operation shown in FIG. 3. In next step 302, the heterogeneousness degree $d_n$ of the new teaching data $E_n$ is calculated by the following expression:

$$d_n = |E_n - O_n| \quad (16)$$

Since the teaching data $E_n$ and output data $O_n$ are vectors whose component number is equal to the node number g of the output layer LO, $d_n$ represents a Euclid distance between both data.

The output data $O_n$ corresponding to the new input data $D_n$ represent values which are predicted based upon the present input-output characteristic of the neural network 10 which has been determined by the initial learning and renewal learning up to the present. Namely, the output data $O_n$ are values which are determined based upon the tendency of past learning of the neural network 10 up to the present. Accordingly, the heterogeneousness degree $d_n$ indicates how far the teaching data $E_n$ are apart from the tendency of past learning.

In next step 304, the heterogeneousness degree $d_n$ is compared with a threshold value f(x). The threshold value f(x) is a function of the number x of renewal learning, as shown in FIG. 10, and the threshold value decreases as the number of renewal learning increases. Therefore, as the renewal learning is repeated, the input-output characteristic of the neural network 10 becomes stable and finally converges. When the input-output characteristic of the neural network 10 is stable, it is preferred not to drastically change the input-output characteristic. On the contrary, when the input-output characteristic of the neural network 10 has not converged yet, it is preferred to correct the input-output characteristic using the new input data and new teaching data which represent a cause-effect relationship in a different condition, because the learning operation has not completed for sufficient number of possible conditions.

While the input-output characteristic of the neural network 10 has not converged yet, the input-output characteristic is corrected with the teaching data even when the heterogeneousness degree $d_n$ is relatively large. After the input-output characteristic of the neural network 10 has already converged, on the contrary, the input-output characteristic is not corrected with the teaching data if the heterogeneousness degree $d_n$ is large.

When it is judged in step 304 that the heterogeneousness degree $d_n$ is equal to or smaller than the threshold value f(x), the processing moves to step 306 in which the new input data $D_n$ and new teaching data $E_n$ are memorized in the input data memory area 31 and teaching data memory area 32, respectively. After that, the learning operation is carried out using the new data base which comprises the new input data $D_n$ and new teaching data $E_n$, in step 308, so that a new input-output characteristic is obtained.

On the contrary, when it is judged in step 304 that the heterogeneousness degree $d_n$ is larger than the threshold value f(x), the processing moves to step 310 in which there are displayed on the CRT of the display device 6 the heterogeneousness degree $d_n$ and a message which informs the operator of the fact that the new input data $D_n$ and new teaching data $E_n$ are not memorized.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of carrying out learning operation of a neural network having at least an input layer composed of plural input nodes and an output layer composed of plural output nodes, said input nodes and said output nodes being operatively coupled with each other with plural connection weights, said method comprising the steps of:

reading out from a data base a pair of input data and teaching data, said input data being composed of plural components respectively corresponding to said input nodes, and said teaching data being composed of plural components respectively corresponding to said output nodes;

judging whether or not each of the components of said teaching data is ineffective data for the purpose of learning operation;

applying said input data to said neural network so that said neural network outputs output data which is composed of plural components corresponding to the components of said teaching data;

calculating differences between the components of said output data and the components of said teaching data;

regarding some differences between s6me components of said output data and ineffective components of said teaching data as zero; and correcting said connection weights based upon the differences.

2. An apparatus for carrying out learning operation of a neural network having at least an input layer comprising plural input nodes and an output layer comprising plural output nodes, said input nodes and said output nodes being operatively coupled with each other with plural connection weights, said apparatus comprising:

a data base for memorizing plural pairs of input data and teaching data;

means for reading out from said data base a pair of input data and teaching data, said input data being composed of plural components respectively corresponding to said input nodes, and said teaching data being composed of plural components respectively corresponding to said output nodes;

means for judging whether or not each of the components of said teaching data is ineffective data for the purpose of learning operation;

means for applying said input data to said neural network so that said neural network outputs output data which is composed of plural components corresponding to the components of said teaching data;

means for calculating differences between the components of said output data and the components of said teaching data;

means for regarding some differences between some components of said output data and ineffective components of said teaching data as zero; and means for correcting said connection weights based upon the differences.

3. An apparatus for carrying out learning operation of a neural network according to claim 2, wherein said means for judging comprises a discrimination data table which memorizes data indicating whether each of the components of said teaching data is effective data or ineffective data, and said judging means judges whether or not each of the components of said teaching data is ineffective data by reference to said table.

4. An apparatus for carrying out learning operation of a neural network according to claim 3, wherein said neural network further comprises an intermediate layer composed of plural nodes, and said correcting means corrects connection weights between said input layer and said intermediate layer, and connection weights between said intermediate layer and said output layer.

5. An apparatus for carrying out learning operation of a neural network according to claim 3, wherein said input data and said teaching data are prepared for each of plural different categories and memorized in said data base, and said discrimination data table is composed of plural memory areas for said different categories each of which memorizes data indicating whether each of the components of said teaching data of respective categories is effective data or ineffective data.

6. An apparatus for carrying out learning operation of a neural network according to claim 2, wherein said apparatus further comprises:

means for inputting new input data and new teaching data for modifying the input-output characteristic of said neural network;

means for applying said input data to said neural network where said neural network outputs data corresponding to said input data;

means for calculating a degree of heterogeneousness of said new teaching data based on differences between said output data and said new teaching data;

means for judging whether or not the degree of heterogeneousness of said teaching data is smaller than a predetermined value; and means for adding said new data and new teaching data into said data base only when said degree of heterogeneousness is smaller than the predetermined value.

7. A method of carrying out learning operation of a neural network having at least an input layer composed of plural input nodes and an output layer composed of plural output nodes, said input nodes and said output nodes being operatively coupled with each of the with plural connection weights, said method comprising the steps of:

reading out from a data base plural pairs of input data and teaching data;

changing said connection weights through a learning operation with said read input data and teaching data so that said neural network has an input-output characteristic;

inputting new input data and new teaching data for modifying the input-output characteristic of said neural network;

applying said input data to said neural network where said neural network outputs output data corresponding to said input data;

calculating a degree of heterogeneousness of said new teaching data based upon differences between said output data and said new teaching data;

judging whether or nor the degree of heterogeneousness of said teaching data is smaller than a predetermined value; and adding said new input data and new teaching data into said data base only when said degree of heterogeneousness is smaller than the predetermined value.

8. An apparatus for carrying out learning operation of a neural network having at least an input layer composed of plural input nodes and an output layer composed of plural output nodes, said input nodes and said output nodes being operatively coupled with each other with plural connection weights, said apparatus comprising:

data base means for memorizing plural pairs of input data and teaching data;

means for reading out from a data base plural pairs of input data and teaching data;

means for changing said connection weights through a learning operation with said read input data and teaching data, said neural network having an input-output characteristic;

means for inputting new input data and new teaching data for modifying the input-output characteristic of said neural network;

means for applying said input data to said neural network so that said neural network outputs output data corresponding to said input data;

means for calculating a degree of heterogeneousness of said new teaching data based upon differences between said output data and said new teaching data;

means for judging whether or not the degree of heterogeneousness of said teaching data is smaller than a predetermined value; and means for adding said new input data and new teaching data into said data base only when said degree of heterogeneousness is smaller than the predetermined value.

9. An apparatus for carrying out learning operation of a neural network according to claim 8, wherein said means for judging further comprises means for changing said predetermined value in accordance with the number of learning operations previously performed.

10. An apparatus for carrying out learning operation of a neural network according to claim 9, wherein said means for calculating calculates said degree of heterogeneousness based upon a Euclid distance between said output data and said teaching data.

* * * * *